US007835650B2

(12) United States Patent
Li et al.

(10) Patent No.: US 7,835,650 B2

(45) Date of Patent: Nov. 16, 2010

(54) OPTICAL DOMAIN FREQUENCY DOWN-CONVERSION OF MICROWAVE SIGNALS

(75) Inventors: Yifei Li, Norwood, PA (US); Peter Herczfeld, Bala Cynwyd, PA (US); David K. Yoo, Vallejo, CA (US)

(73) Assignee: Drexel University, Philadelphia, PA (US)

( * ) Notice: Subject to any disclaimer, the term of this patent is extended or adjusted under 35 U.S.C. 154(b) by 672 days.

(21) Appl. No.: 11/776,322

(22) Filed: Jul. 11, 2007

(65) Prior Publication Data

US 2008/0013150 A1 Jan. 17, 2008

Related U.S. Application Data

(60) Provisional application No. 60/807,023, filed on Jul. 11, 2006.

(51) Int. Cl.
*G02F 1/01* (2006.01)

(52) U.S. Cl. ....................... 398/212; 398/202; 398/203; 398/204

(58) Field of Classification Search .......... 398/202–204
See application file for complete search history.

(56) References Cited

U.S. PATENT DOCUMENTS 3,878,527 A * 4/1975 Rensin et al. ............... 342/103
3,886,556 A * 5/1975 Lowman ..................... 342/437
3,971,019 A * 7/1976 Rymes ....................... 342/175
4,238,778 A * 12/1980 Ohsumi ...................... 340/903
4,314,206 A * 2/1982 Attwood et al. ............... 331/12
4,737,968 A * 4/1988 Norton et al. ............... 375/297
4,942,374 A * 7/1990 Sai ............................ 332/124
4,987,386 A * 1/1991 Poklemba et al. ............. 331/10
5,115,332 A * 5/1992 Naito et al. ................. 398/202
5,146,359 A * 9/1992 Okoshi et al. ............... 398/202
5,319,438 A * 6/1994 Kiasaleh ..................... 398/203
5,446,574 A * 8/1995 Djupsjobacka et al. ...... 398/147
5,504,465 A * 4/1996 Yung et al. .................. 332/145
6,154,483 A * 11/2000 Davidovici et al. ......... 375/130
6,249,189 B1 * 6/2001 Wu et al. ...................... 331/18
6,304,751 B1 * 10/2001 King .......................... 455/306
7,047,555 B1 * 5/2006 Inaguma et al. ............. 725/149
7,085,499 B2 * 8/2006 Yap et al. .................... 398/183
7,113,760 B1 * 9/2006 Petrov et al. ................ 455/324
7,269,354 B1 * 9/2007 Silverman et al. ........... 398/115
7,609,979 B2 * 10/2009 Taylor ........................ 398/204

(Continued)

OTHER PUBLICATIONS

Yifei Li; Yoo, D.; Herczfeld, P.; Rosen, A.; Madjar, A.; Goldwasser, S.; , "Receiver for a coherent fiber-optic link with high dynamic range and low noise figure," Microwave Photonics, 2005. MWP 2005. International Topical Meeting on , vol., no., pp. 273-276, Oct. 12-14, 2005 URL: http://ieeexplore.ieee.org/stamp/stamp.jsp?tp=&arnumber=1590320&isnu.*

*Primary Examiner*—Ken N Vanderpuye
*Assistant Examiner*—Tanya Ngo
(74) *Attorney, Agent, or Firm*—Woodcock Washburn, LLP

(57) ABSTRACT

A linear phase demodulator/down-converter comprises an optical amplitude modulator for modulating the amplitude of an optical input signal, a photo-detector, a loop filter and an optical phase modulator provided with a light source. The optical phase modulator/down-converter provides optical down conversion, optical up conversion, or a combination thereof. The photo-detector can be a balanced photo-detector. Linear phase demodulation and/or down conversion is performed completely in the optical domain.

15 Claims, 12 Drawing Sheets

U.S. PATENT DOCUMENTS 7,653,318 B2 * 1/2010 Li et al. .................... 398/209
2003/0090767 A1 * 5/2003 Yap et al. .................... 359/181
2004/0208643 A1 * 10/2004 Roberts et al. .............. 398/186
2004/0208646 A1 * 10/2004 Choudhary et al. ......... 398/188
2005/0064819 A1 * 3/2005 Chiu et al. .................... 455/42
2005/0212977 A1 * 9/2005 Zhu et al. .................... 348/725
2006/0055824 A1 * 3/2006 Zhu et al. .................... 348/554
2006/0058001 A1 * 3/2006 Minnis et al. ............... 455/334
2006/0238395 A1 * 10/2006 Nagai et al. ................. 341/143
2006/0244973 A1 * 11/2006 Yun et al. .................... 356/511
2006/0251420 A1 * 11/2006 Li et al. ........................ 398/66
2007/0154223 A1 * 7/2007 Newell et al. ............... 398/147
2007/0155348 A1 * 7/2007 Razavi et al. ............... 455/118
2008/0043818 A1 * 2/2008 Tal et al. ..................... 375/135
2008/0292326 A1 * 11/2008 Ferrero et al. ............... 398/213
2009/0115903 A1 * 5/2009 Zhu et al. ................... 348/572
2009/0279642 A1 * 11/2009 Zarei .......................... 375/327
2010/0009641 A1 * 1/2010 Osman et al. ............... 455/102
2010/0040184 A1 * 2/2010 Haralabidis et al. ......... 375/373
2010/0102895 A1 * 4/2010 Beukema et al. ............ 332/103

* cited by examiner

OPTICAL DOMAIN FREQUENCY DOWN-CONVERSION OF MICROWAVE SIGNALS

CROSS REFERENCE TO RELATED APPLICATIONS

The present application claims priority to U.S. Provisional Patent Application No. 60/807,023, entitled "Optical Domain Frequency Down-Conversion Of Microwave Signals" filed Jul. 11, 2002, which is hereby incorporated by reference in its entirety.

TECHNICAL FIELD

The technical field generally relates to data links, and more specifically relates to an optical phase modulated data link using a photonic phase-locked loop demodulator/down-converter and/or optical domain down conversion of microwave signals.

BACKGROUND

Many systems comprise components that are physically separated and coupled via data links. For example, military systems containing communications equipment, radar equipment, and electronic warfare (EW) systems typically comprise components such as sensors, central processing units (CPUs) or control units, and phased array antennas, placed at different locations. A data link provides the connectivity that enables data flow between such components. Accordingly the data link is an integral part of the system. A problem however, is that, due to interference resulting from, for example, implementation of broadband communication schemes, the presence of strong interfering signals, the use of multifunction transmit receive apertures, and the like, a data link can potentially be a performance limiting factor of the system.

Attempts to improve data link performance have included the use of optical data links. In an optical data link, data is modulated via an optical carrier signal and transmitted over optical fiber. Typically, the intensity of the optical carrier signal emanating from a laser source is modulated and propagated along the optical link. The modulated optical carrier signal is converted back to an electric signal and demodulated. A problem associated with such a data link is the occurrence of nonlinear distortion incurred within the modulation and demodulation processes.

SUMMARY

This Summary is provided to introduce a selection of concepts in a simplified form. This Summary is not intended to be used to limit the scope of the claimed subject matter.

An optical linear phase demodulator/frequency down-converter performs frequency conversion entirely in the optical domain. The optical linear phase demodulator comprises an optical amplitude modulator for modulating the amplitude of an optical input signal, a photo-detector optically connected to the optical amplitude modulator for receiving a modulated input signal from the optical amplitude modulator, and a loop filter operatively associated with the photo-detector. In an example configuration, the optical linear phase demodulator/frequency down-converter includes a light source (e.g., laser) that is operatively associated with the loop filter and photo-detector. Optical frequency down conversion is accomplished by modulating the amplitude of an optical input signal via the optical amplitude modulator and providing the modulated optical signal to a photo-detector. The optical signal from the photo-detector is filtered utilizing a loop filter, and optical frequency down conversion is preformed on the filtered optical signal. The resultant down converted optical signal is repeated operated on by the photo-detector and loop filter as needed.

BRIEF DESCRIPTION OF THE DRAWINGS

The foregoing summary, as well as the following detailed description, is better understood when read in conjunction with the appended drawings.

DETAILED DESCRIPTION OF ILLUSTRATIVE EMBODIMENTS

An optical linear phase demodulator/frequency down-converter, as described herein, comprises a frequency down-converter for an optical phase modulated (PM) link using a photonic phase-locked loop (PPLL) demodulator. The optical linear phase demodulator/frequency down-converter enables frequency down conversion to be accomplished entirely in the optical domain, resulting in a preservation of the high performance of the optical PM link. Various embodiments of the optical linear phase demodulator/frequency down-converter employ an optical domain down converter (ODC). Information transmitted in the microwave frequency range is mixed down to baseband or an intermediate frequency (IF) in an all-optical process that avoids the use of any active electronic devices in the signal path which would otherwise add excess noise and distortion and limit the dynamic range of the system.

As previously described, a problem associated with data links is the occurrence of nonlinear distortion incurred within the modulation and demodulation processes. A common measure of this type of distortion (or lack thereof) is known as the spurious free dynamic range (SFDR). The SFDR is the ratio of the root mean square (RMS) value of the amplitude of a signal of interest (e.g., the carrier signal) to the RMS value of a distortion component (e.g., harmonics) in a specified frequency range. The optical linear phase demodulator/frequency down-converter preserves the dynamic range and noise figures of the PM optical link, up to a dynamic range of about 153 dB $Hz^{2/3}$. The superscript (2/3) indicates that the dynamic range is limited by third order system nonlinearity for 2-tone SFDR (corresponding to 97 dB in an instantaneous bandwidth of 20 500 MHz) and 2.3 dB for noise figure.

Figure 1:
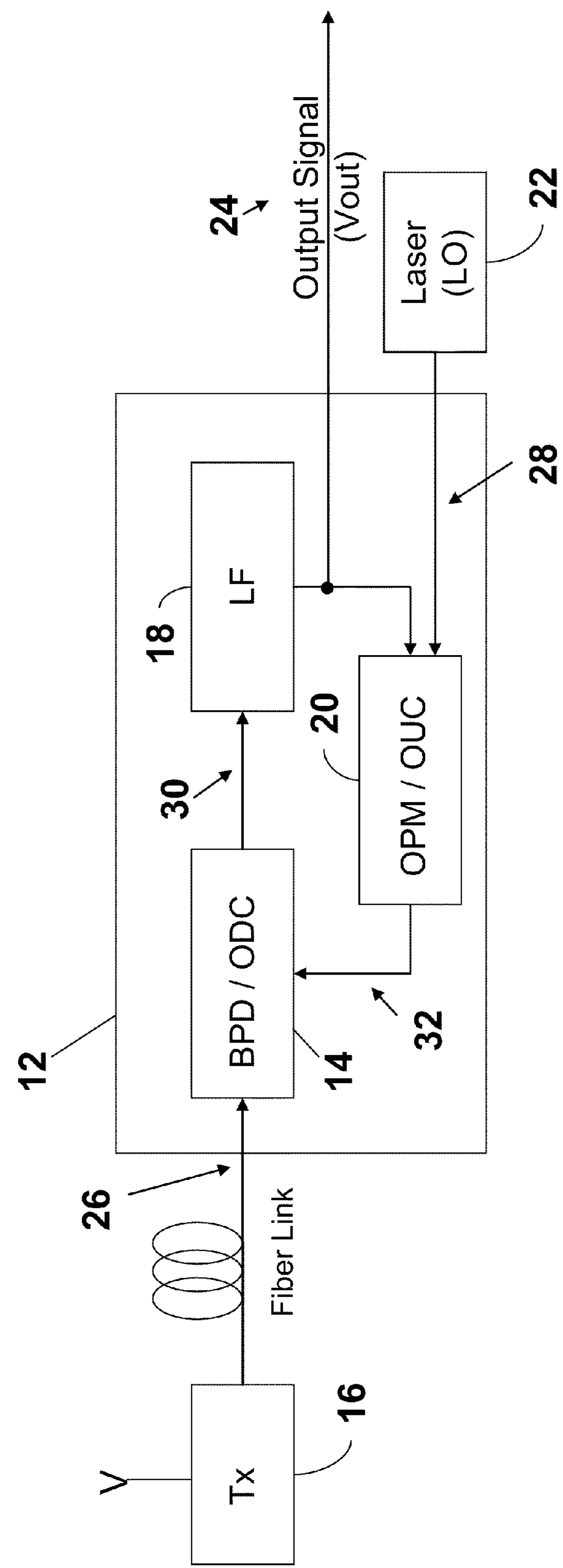
FIG. 1 is a block diagram of an example optical linear phase demodulator/frequency down-converter.

FIG. 1 is a block diagram of an example optical linear phase demodulator/frequency down-converter 12. In an example configuration, the optical linear phase demodulator/frequency down-converter 12 comprises a balanced photo-detector with optical down converter (BPD/ODC) 14, a loop filter (LF) 18, and an optical phase modulator with an optical up converter (OPM/OUC) 20. The optical linear phase demodulator/frequency down-converter 12 can also include a light source, such as laser 22, comprising a local oscillator (LO) and transmitter (Tx) 16

Initially, the optical signal 26 from the transmitter 16 and the optical signal 28 from the local laser 22 are set at quadrature (90° phase difference). When the optical signal 26 of the transmitter 16 undergoes a phase perturbation, the BPD/ODC 14 produces a non-zero error signal 30, which passes through the loop filter 18 and modulates, at the OPM/OUC 20, the optical phase of the local oscillator (LO) laser 22 signal 28 to diminish the phase difference between the two optical signals 26 and 28. Ideally, if the loop latency is infinitely short and loop gain is infinitely high, the PPLL 12 forces the phase of the modulated LO optical signal 32 to exactly mirror that of the input optical signal 26. Thus, ideally, the output optical signal, Vout, 24 is a strict replica of the input signal, Vin, 26. However, due to finite loop gain, a small but non-vanishing difference between the phases of the two signals 26 and 32 can exist. Because of various non-linearities in the loop, this difference creates non-linear distortion at the PPLL output optical signal 24. One type of non-linearity occurs because the error signal 30 produced by BPD/ODC 14 is a sinusoidal function of the phase difference, which results in non-linearity distortion when the phase difference is non-zero. At high optical power, such non-linear distortion can intensify due to the saturation of the BPD/ODC 14. In addition, if there were active electronic components in the loop, the error signal produced by the BPD/ODC 14 could be further distorted by non-linearity of such active electronic components. These non-linearities are avoided by achieving a desired high loop gain without active electronics inside the loop.

Figure 2:
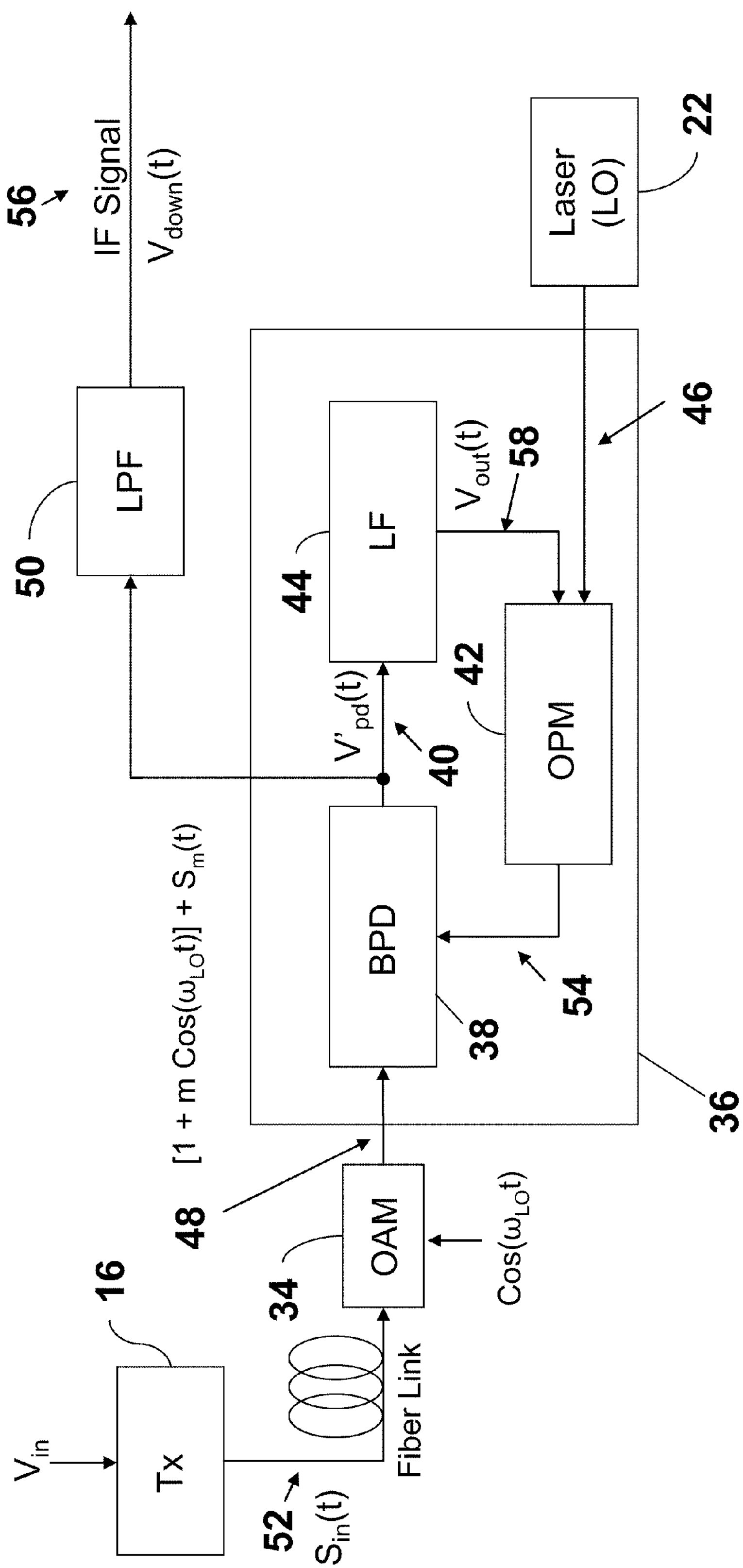
FIG. 2 is another block diagram of an example photonic phase locked loop comprising direct optical down conversion.

FIG. 2 is another block diagram of an example photonic phase locked loop (PPLL) 36 comprising direct optical down conversion. The direct optical down-conversion (ODC) scheme depicted in FIG. 2 comprises a PPLL 36, a transmitter (Tx) 16, a balanced photo-detector (BPD) 38, loop filter (LF) 44, an optical phase modulator (OPM) 42, an optical amplitude modulator (OAM) 34, and a low pass filter (LPF) 50. This scheme is suitable for applications where the radio frequency (RF) carrier frequencies of signals provided to the transmitter 16, are fixed or channelized. Direct ODC requires no modification to the PPLL 36 described above with respect to FIG. 1. As depicted in FIG. 2, the amplitude (not intensity) of the information-bearing optical signal ($S_{in}(t)$) 52 is modulated, by the OAM 34, with a finite modulation index, m, to produce modulated signal 48. The modulated signal 48 is provided to the balanced photo-detector (BPD) 38. The amplitude modulation does not affect the phase of the optical carrier that contains the information. At balanced photo-detector 38, the microwave modulated optical amplitude mixes (via multiplication) with the information bearing optical phase mix. The resulting signal, $V'_{pd}(t)$, 40 provided by the balanced photo-detector 38 is mathematically represented by equation (1) below.

$$V'_{pd}(t)=V_{pd}(t)+m\cdot\cos(\omega_{LO}t)\cdot V_{pd}(t), \quad (1)$$

where, LO is the frequency of the signal 46 provided by the light source 22, t is time, ω is equal to 2π, and $V_{pd}(t)$ is represented mathematically by equation (2) below.

$$V_{pd}(t) = 2R_{pd}\cdot\sqrt{P_{Tx}\cdot P_{LO}}\cdot R_{term}\cdot\sin[\beta_{Tx}V_{in}(t)-\theta(t)], \quad (2)$$

where, $P_{Tx}$ and $P_{LO}$ are the optical power of the signals 52 and 22 from the transmitter 16 and the LO laser 22, respectively; $R_{pd}$ is the photo-detector responsivity; $R_{term}$ is the photo-detector termination resistance; and θ is the phase modulation introduce by the optical phase modulator 42; and $V_{in}$ is the signal provided to the transmitter 16 and is represented mathematically by equation (3) below.

$$V_{in}=A(t)\cos[\omega_{RF}t+\phi(t)], \quad (3)$$

where, A(t) and φ(t) are the information bearing amplitude and phase, respectively, of the RF signal 52 from the transmitter 16, $\omega_{RF}$ is the RF frequency of the signal 52 from the transmitter 16.

Figure 3:
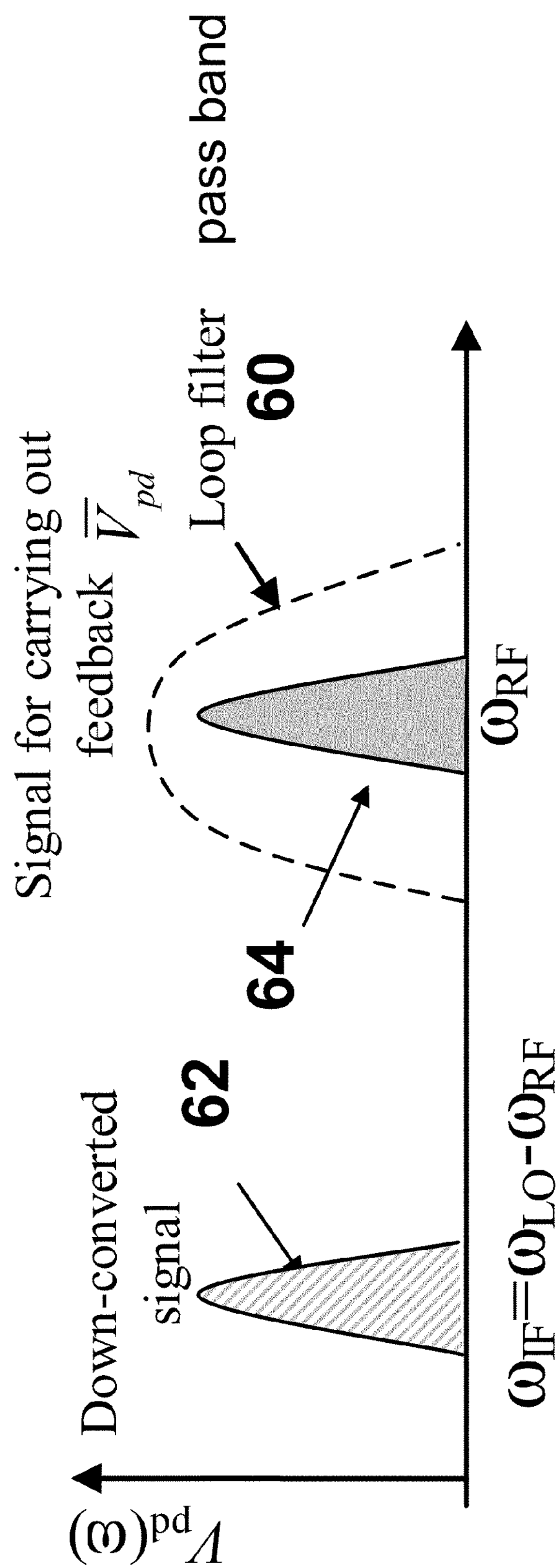
FIG. 3 is a graphical depiction of the frequency domain spectrum of the output signal from a balanced photo-detector.

FIG. 3 is a graphical depiction of the frequency domain spectrum of the output signal 40 from the balanced photo-detector 38. As shown in FIG. 3, the balanced photo-detector output signal $V'_{pd}(t)$ 40 comprises two components. One signal component 62 is utilized to perform frequency down conversion and the other signal component, ∇ pd, 64 is utilized as a feedback signal for the PPLL 36. Therefore, in direct ODC, the signal component corresponding to $V_{pd}(t)$ in equation (1), implements feedback control for the PPLL 36 of FIG. 2. The signal component corresponding to $m\cdot\cos(\omega_{LO}t)\cdot V_{pd}(t)$ produces the down conversion. Since the PPLL tracking process is independent of the down conversion, the system performance metrics (e.g., SFDR) still hold for the loop filter output voltage, $V_{out}(t)$ 58. In addition, no nonlinear distortion is introduced by the loop filter 44. If the loop filter 44 has unity response in the signal band, those results also hold for the signal ∇ pd. The down converted signal is essentially the product of ∇ pd, and the LO carrier signal. Thus, there is no added nonlinear distortion to the down converted signal, $V_{down}(t)$, as shown in FIG. 2. The down converted signal, $V_{down}(t)$, 56, which is the intermediate frequency (IF) optical signal 56 provide by low pass filter 50, can be mathematically represented by equation (4) below.

$$V_{down}(t) = \frac{m}{2}\cdot|G_{link}|\cdot A(t)\cdot\cos(\omega_{IF}t+\phi(t)) \quad (4)$$

where $G_{link}$ is a value of gain attributable to the fiber optic link; A(t) and φ(t) are the information bearing amplitude and phase, respectively, of the RF signal 52 from the transmitter 16, $\omega_{IF}$ is the down converted intermediate frequency.

Increasing the amplitude modulation index, m, to the point where m>2 (i.e., beyond the point of over modulation) eliminates the effective conversion loss. Thus, by using the PPLL in conjunction with the direct ODC technique, it is possible to achieve both strictly linear phase demodulation and down conversion to the IF range with essentially no penalty.

In this example approach, the PPLL feedback control operates at RF frequencies. Thus, the balanced photo-detector structure scales to high RF frequencies (e.g., to the upper limit of 18 GHz) while maintaining high saturation power levels (>600 mW) in order for the PPLL to perform strictly linear phase demodulation. Because the loop filter utilized for the PPLL using direct ODC is band pass, each PPLL receiver is appropriate for a fixed channel (e.g., carrier frequency) only. The PPLL feedback control utilized in this ODC scheme operates at RF frequencies (e.g., from 0.5 to 18 GHz), which means the balanced photo-detector scales to high RF frequencies (e.g., to the upper limit of 18 GHz) while still maintaining high saturation power levels (>600 mW) to attain strictly linear phase demodulation. Because the required saturation power may be difficult to achieve at these high frequencies, an alternative approach which allows the PPLL feedback to operate at the IF or baseband, may be desirable.

An alternative approach, referred to as optical down/up conversion (ODUC) is an extension of the direct ODC scheme described above. ODUC uses the down converted signal at the balanced photo-detector to carry out the feedback control of the PPLL. Thus, ODUC relieves the latency and power demands placed on the balanced photo-detector and allows the optimization of a single PPLL receiver structure across all channels in the spectrum. Altering the receiver channel in such a design only requires changing the local oscillator (LO) frequency.

Figure 4:
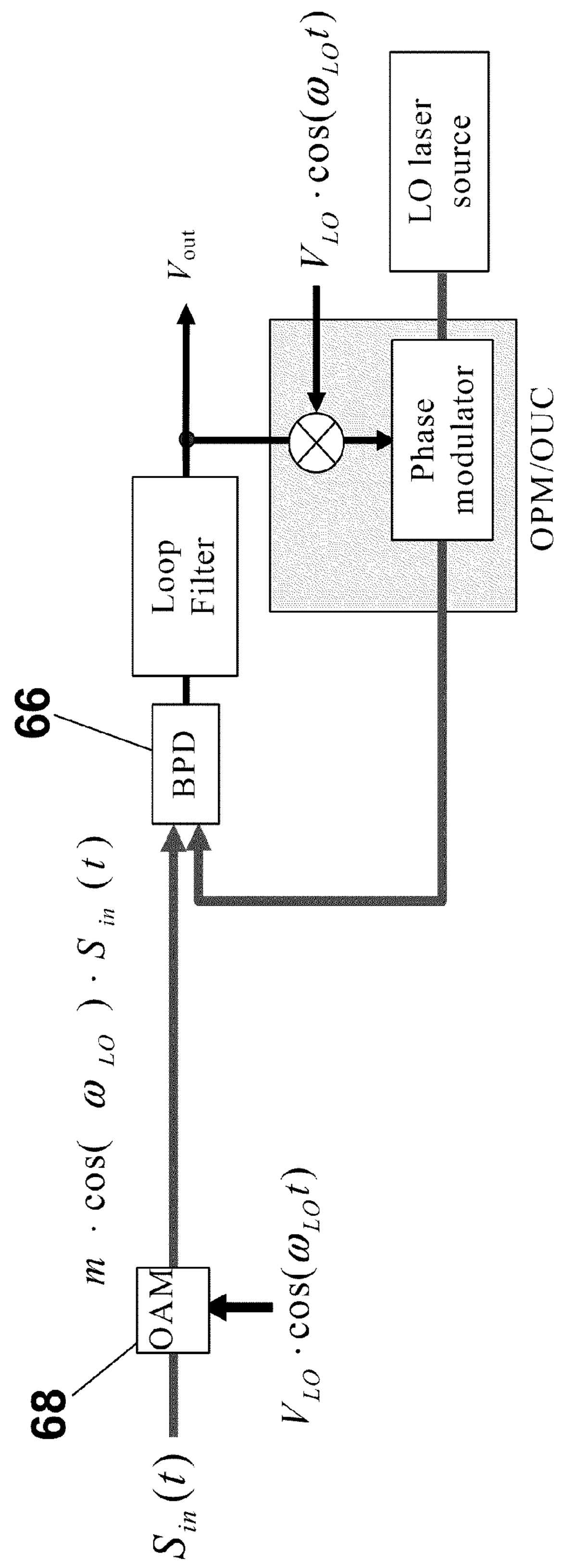
FIG. 4 is a block diagram of an example PPLL with ODUC.

FIG. 4 is a block diagram of an example PPLL with ODUC. As in ODC, the down conversion is achieved by mixing the optical phase and optical amplitude inside the balanced photo-detector 66. The difference is that the optical amplitude modulator (OAM) 68 inside the receiver is set to have a maximal modulation index, and only the down converted signal is present at the output of the detector, since the PPLL relies on the down converted signal for tracking. In order to close the loop, the down converted signal is later mixed up to the original microwave frequency by a quadratic optical phase modulator/optical up converter (OPM/OUC) module (the quadrature OPM/OUC not shown in FIG. 4).

Figure 5:
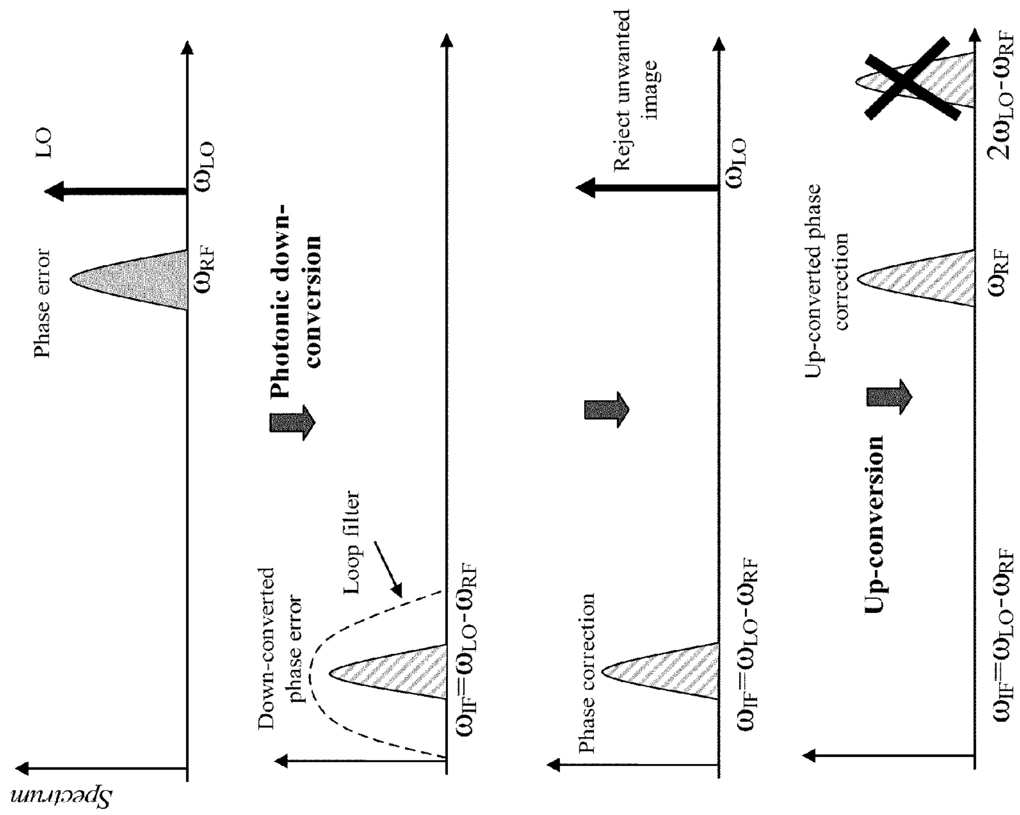
FIG. 5 is a graphical depiction of an example ODUC process.
Figure 6:
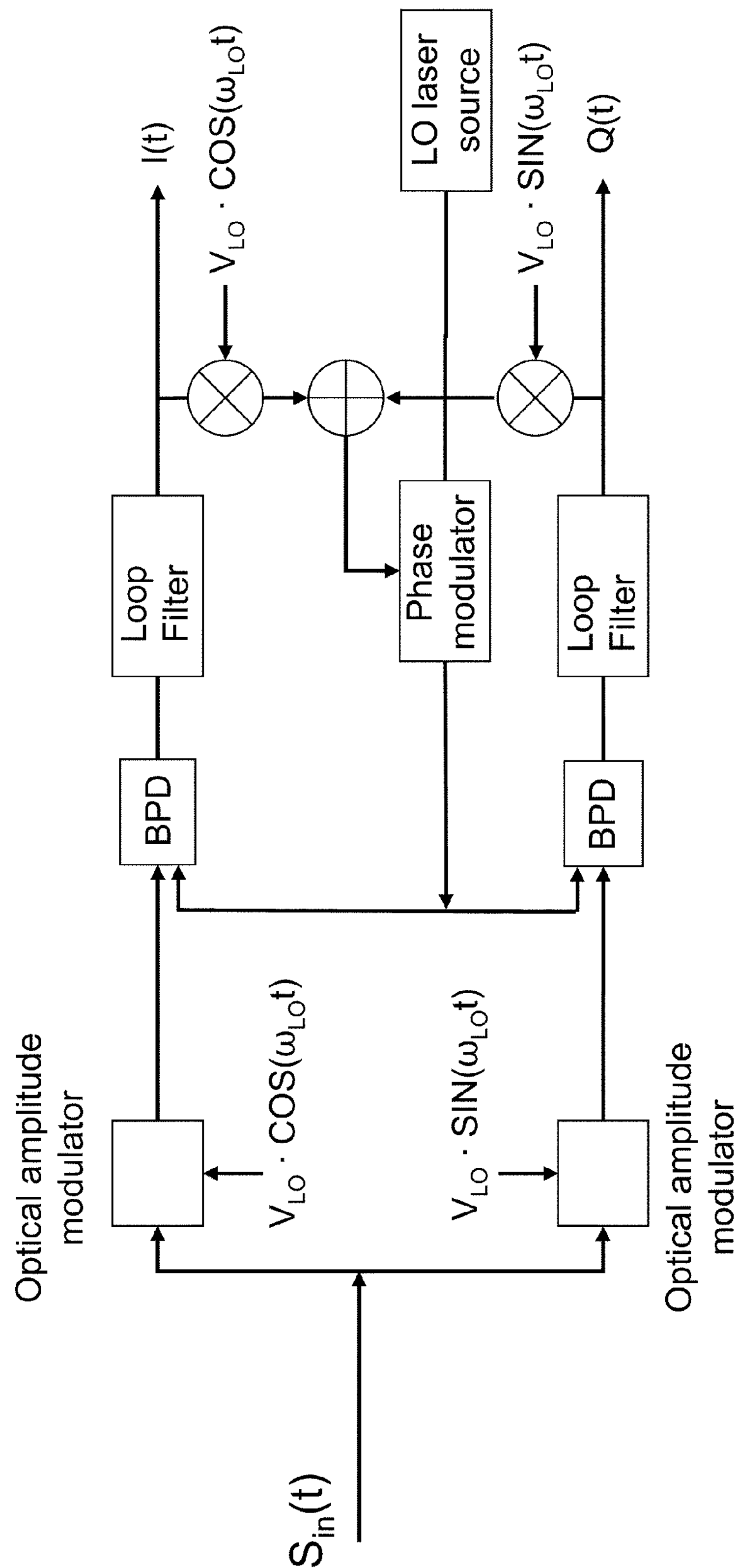
FIG. 6 is a block diagram of PPLL with optical down/up conversion to baseband.

FIG. 5 is a graphical depiction of an example ODUC process. To minimize the demands on the balanced photo-detector and to further assist the receiver back-end, the PPLL/ODUC receiver may down convert to baseband. As a result, the balanced detector need handle only half of the information bandwidth of the RF signal (because the output will be baseband I and Q). In order to yield both the in-phase I(t) and the quadrature Q(t) components of the baseband signal, a pair of PPLLs can be placed in quadrature as shown in FIG. 6. An advantage of the example configuration depicted in FIG. 5 is that there is not need for image rejection hardware. Image rejection is accomplished automatically in the I(t) and Q(t) demodulation process.

Figure 7:
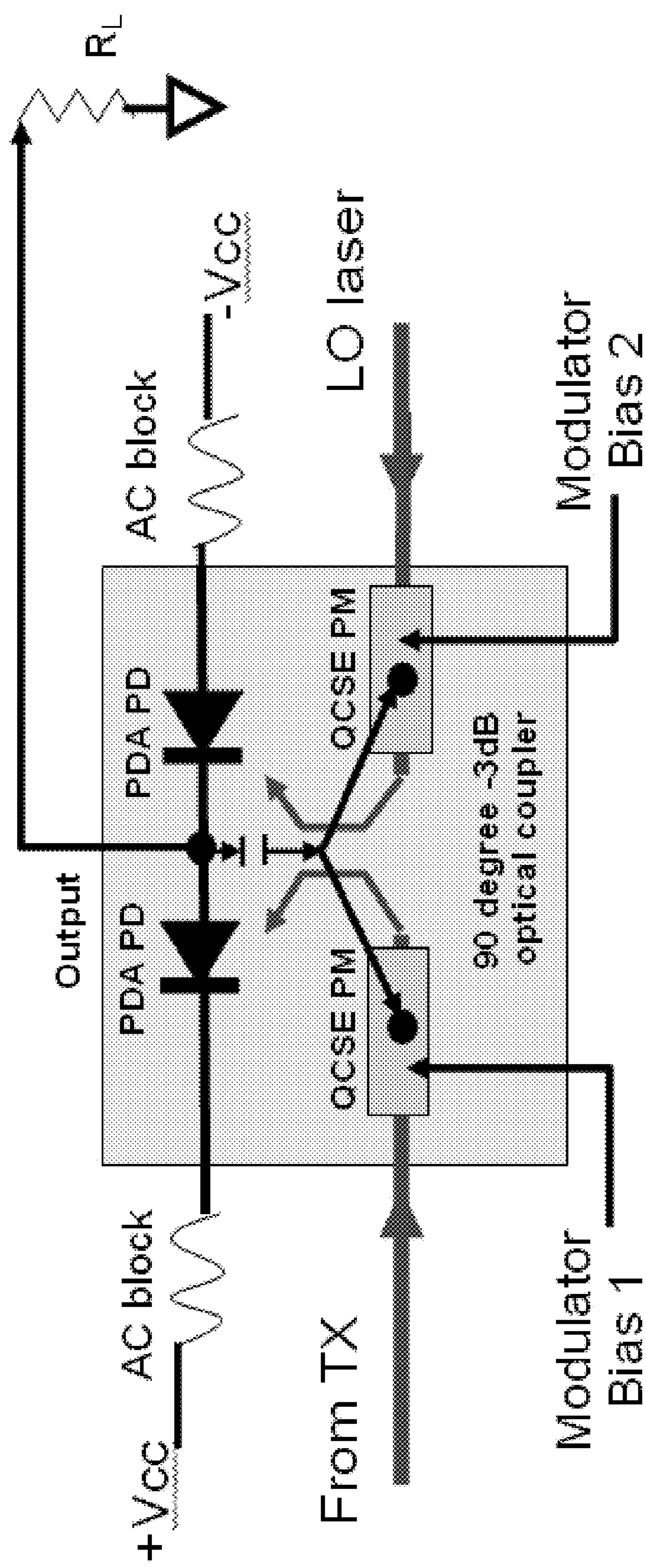
FIG. 7 is a depiction of an example PPLL in a push pull configuration.

FIG. 7 is a depiction of an example PPLL in a push pull configuration. The PPLL depicted in FIG. 7 comprises a complete phase demodulator/downconverter, that employs a pair of balanced high power, partially depleted absorber (PDA) photo-detectors and a pair of high sensitivity Quantum Confined Stark Effect phase modulators (QCSE PMs). No loop filter is explicitly shown because this example embodiment employs the direct use of the parasitic, RC low pass response of the high power photo-detectors themselves to implement this function. This configuration further minimizes loop latency. Because this approach alters the external bias voltage applied to the QCSE-PMs, the same device can be used for both down conversion schemes (ODC/ODUC).

Figure 8:
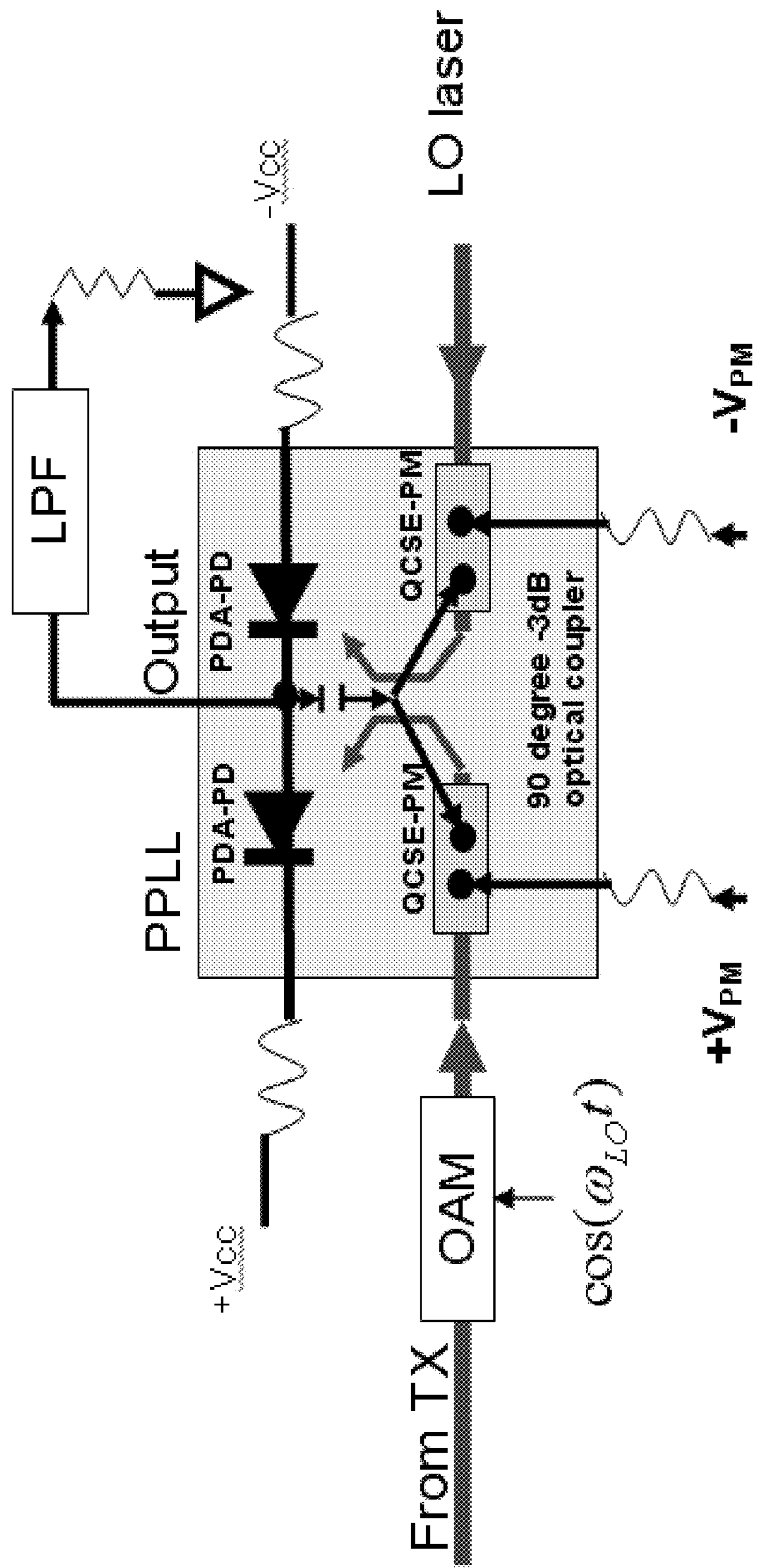
FIG. 8 is a depiction of an example configuration of a PPLL with direct ODC.

FIG. 8 is a depiction of an example configuration of a PPLL with direct ODC. In direct ODC, the PPLL is based on an ideal linear phase modulator. The QCSE PM is inherently a quadratic phase modulator, in which the phase shift is proportional to the square of the applied voltage. In conventional QCSE phase modulators, the modulator is biased at high DC voltage to yield highly sensitive, effectively linear phase modulation. However, in doing so, the quadratic effect is still present, though being smaller compared with the linear effect. This may introduce unwanted nonlinear distortion to the PPLL output. Therefore, in the PPLL, a push pull phase configuration is implemented, wherein the DC biases of the QCSE PMs are set in opposing polarity. As a result, by use of the popular push pull configuration, the linear phase modulation effect is doubled and the quadratic phase modulation is cancelled.

Figure 9:
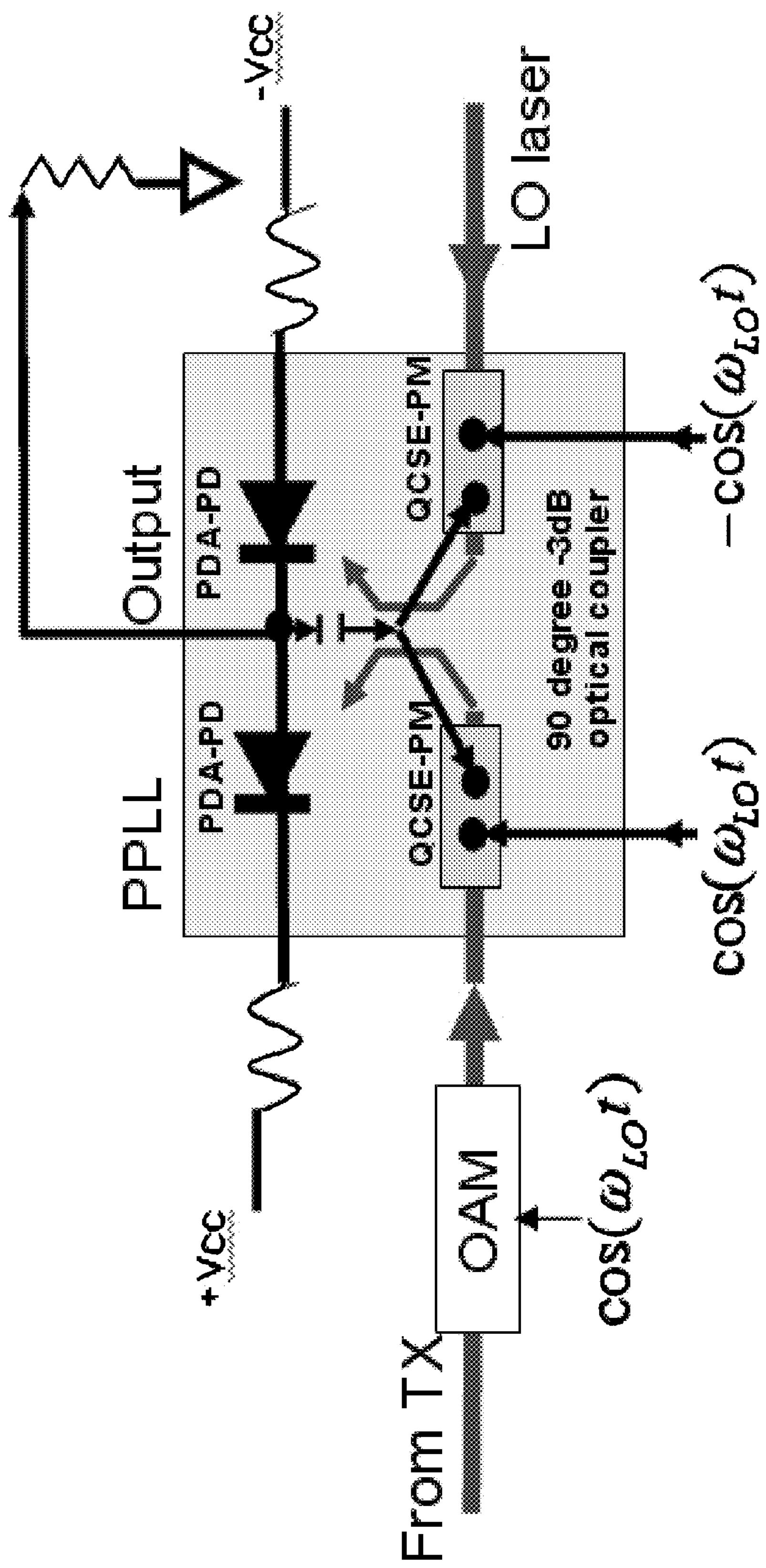
FIG. 9 is a depiction of a PPLL with ODUC.

Similarly, by replacing the DC bias voltage with a microwave local oscillator (LO) signal, the QCSE PM gains the functionality of the PM/OUC module, which is a sub-system that can be used for optical down/up conversion (ODUC). This is depicted in FIG. 9 with only the inphase (I) baseband signal extracted. Placing two such modules in quadrature, an I/Q cross-cancellation structure can be realized.

Figure 10:
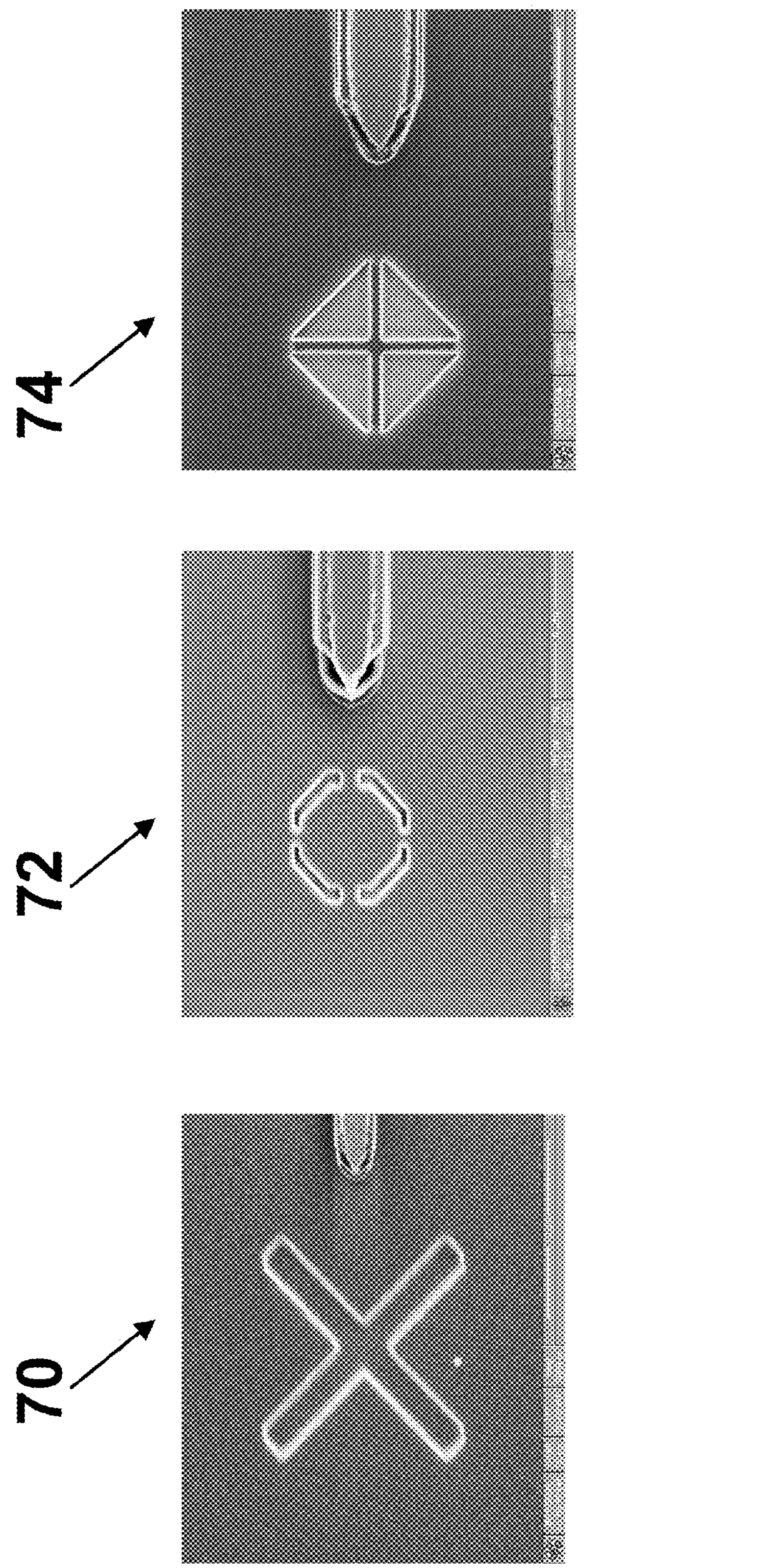
FIG. 10 is a depiction of three directional couplers and splitters written directly into an InP substrate by a focused ion beam.

A 3 dB, 90 degree optical coupler for the balanced photodiode can be fabricated as follows. An InP substrate surface is imaged with a focused ion beam (FIB) before patterning to determine the area of interest. Subsequently, the wafer surface is etched in a predefined pattern for the prototype coupler structures. The FIB ion optics has better than 7 nm resolution, which is sufficient for the 3 dB, 90 degree optical coupler at the 1500 nm wavelength. The FIB system also has the ability to selectively deposit material (e.g., metals, semiconductors, and dielectrics) to further optimize the hybrid integration. Shown in FIG. 10 are three examples 70, 72, and 74, of more sophisticated four-directional couplers fabricated by use of an FIB. From left to right are: an X-shaped coupler 70, an octagon shaped coupler 72, and a diamond shaped coupler 74. These four directional couplers couple light to and from four directions with six independent degrees of freedom. The PPLL micro system, comprising photonic and microwave components, can be fabricated onto a single monolithic substrate. This can reduce loop delay time. In an example embodiment, the loop delay time is maintained under 8 pico seconds. For an InP based photonic circuit with an effective index of refraction of approximately 3.3, this translates to a dimensional path length totaling about 800 microns. This dictates that the constituent parts of the loop be integrated in extremely close proximity. Reactive ion etching can be used for this application. This allows the micro-chasms to be precisely aligned to the active waveguides which will constitute the loop. Discrete components such as detectors and phase modulators can be placed in these micro-chasms using nano-manipulators. These nano-manipulators can be mounted in a focused ion beam (FIB) nanofabrication system. The FIB also can be used for additional fine cutting to ensure correct fit, and to write nano-photonic couplers for beam splitting and beam combining. Further, the focused ion beam system has the ability to selectively deposit material (e.g., metals, semiconductors, and dielectrics) on the sidewalls of the micro-chasm for mechanical fit, electrical connection or isolation. Further, the balanced photo-detector, phase modulator, and LO laser diode can be fabricated on a single wafer while minimizing regrowth.

Figure 11:
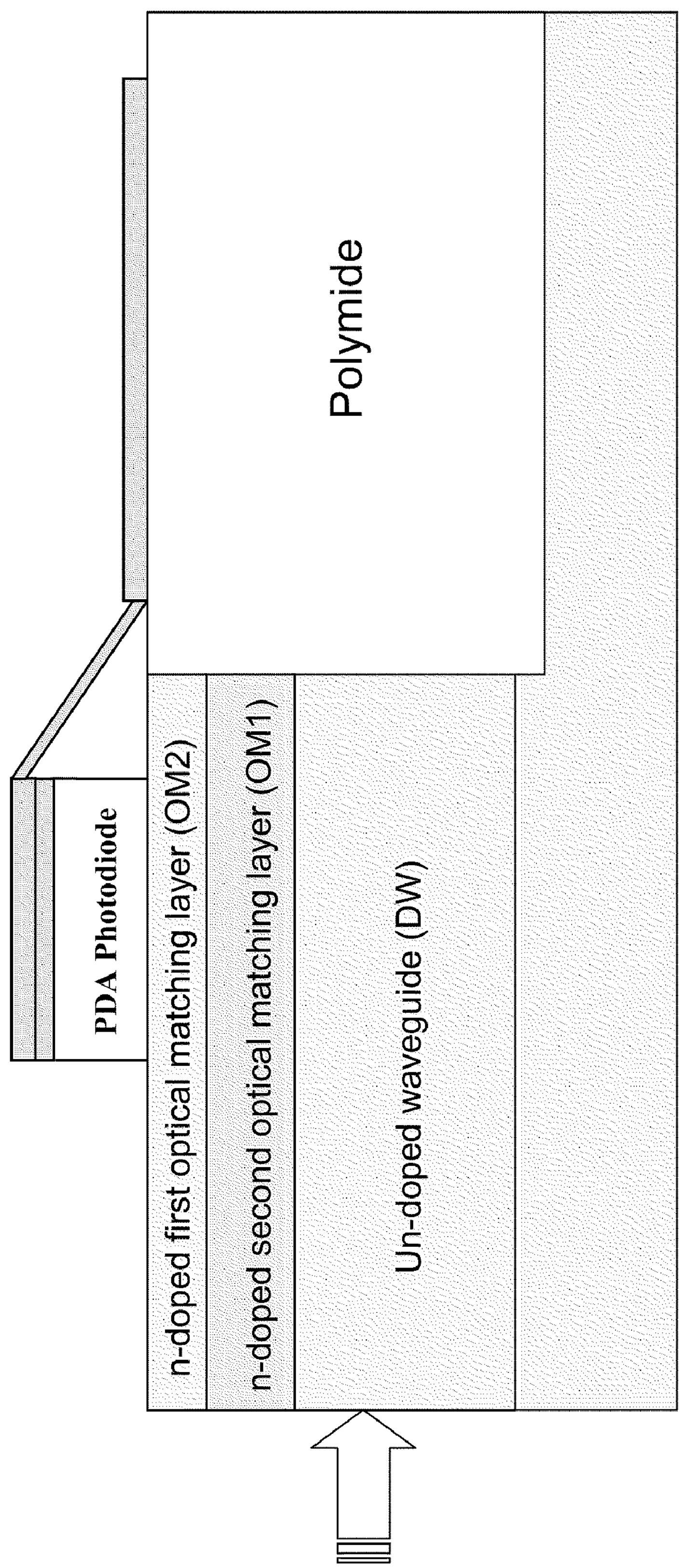
FIG. 11 is a depiction of a cross-section of an evanescently-coupled photodiode.
Figure 12:
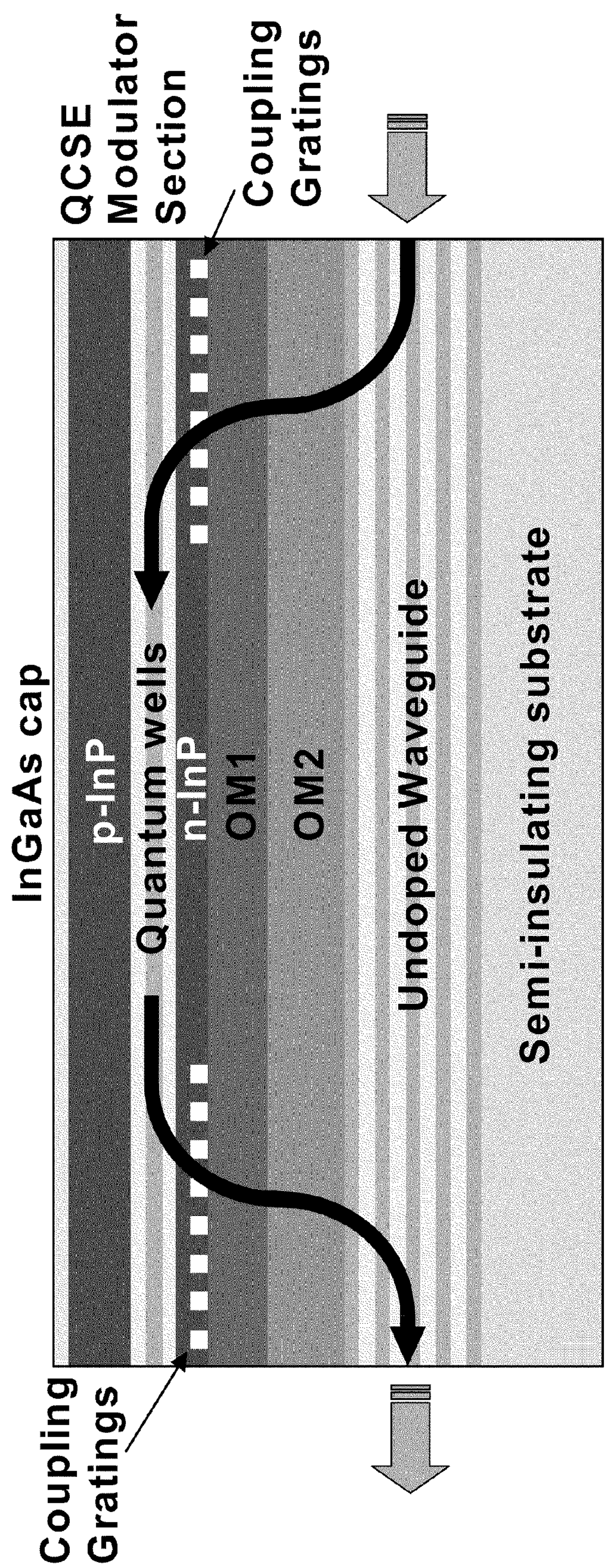
FIG. 12 depicts a grating assisted directional coupler to increase the optical power in the QCSE modulator.

The following components can be fabricated on a single wafer while minimizing regrowth steps: balanced photo-detectors, phase modulators, connecting waveguides, beam splitters and corner turning mirrors. The design described above entails using n and p doped layers of In, Ga, and As/InP to control the charge carrier effects that limit performance. To allow multiple quantum well (MQW) QCSE phase-shifter design, a selective regrowth can be used for the balanced detector. The basic epitaxial structure will include the common, low-loss undoped waveguide common to both the balanced detector and the phase shifter as shown in FIG. 11 and FIG. 12. The first epitaxial growth can include the complete structure for the modulator. The first growth also can include the balanced detector layers. After removal of 'the top PDA layers, as shown in FIG. 12, everywhere but in the balanced photo-detector region, the MQW epilayers can be selectively regrown over the common waveguide to from the phase shifter. If necessary, gratings can be fabricated by holographic lithography in the appropriate regions to provide grating assisted directional couplers (as depicted in FIG. 12) before regrowth of the phase shift sections. Such couplers can be used to increase the optical power in the MQW regions of the phase shifter for improved efficiency. Wafer scale reactive ion etching of the nano-photonic couplers can be used to provide a high yield and rapid fabrication process with better commercial economics.

While illustrative embodiments have various figures, it is to be understood that other similar embodiments can be used or modifications and additions can be made to the described embodiment for performing optical linear phase demodulation/frequency down-conversion without deviating therefrom. Therefore, optical linear phase demodulation/frequency down-conversion should not be limited to any single embodiment, but rather should be construed in breadth and scope in accordance with the appended claims.

What is claimed:

1. An optical linear phase demodulator/down converter comprising:

an optical amplitude modulator configured to modulate an amplitude of an optical input signal with an input signal to provide a modulated optical input signal;

a photo-detector optically connected to the optical amplitude modulator, the photo-detector configured to receive the modulated optical input signal from the optical amplitude modulator and provide a composite signal comprising a first component utilized to perform frequency down conversion of the optical input signal and a second component utilized as a feedback signal;

a loop filter operatively associated with the photo-detector, the loop filter configured to filter the composite signal to provide the feedback a filtered optical signal; and an optical phase modulator configured to:

receive a light source;

modulate the feedback signal with the received light source to provide a modulated feedback signal; and provide the modulated feedback signal to the photo-detector.

2. The optical linear phase demodulator/down converter in accordance with claim 1, wherein frequency down conversion is performed entirely in an optical domain.

3. The optical linear phase demodulator/down converter in accordance with claim 1, further comprising a low pass filter configured to filter the composite signal to provide a first component of the composite signal.

4. The optical linear phase demodulator/down converter in accordance with claim 1, wherein the photo-detector comprises a balanced photo-detector.

5. The optical linear phase demodulator/down converter in accordance with claim 1, further comprising:

a plurality of optical amplitude modulators configured to modulate a respective plurality of optical input signals in parallel;

a plurality of photo-detectors configured to receive, respectively, a plurality of modulated optical input signals from the plurality of optical amplitude modulators; and a plurality of loop filter operatively associated, respectively, with the plurality of photo-detectors, the plurality of loop filters configured to provide a plurality of filtered signals to the optical phase modulator.

6. The optical linear phase demodulator/down converter in accordance with claim 5, wherein the plurality of optical input signals comprises a plurality of portions of a single optical input signal.

7. The optical linear phase demodulator/down converter in accordance with claim 1, wherein the optical linear phase demodulator/down converter comprises no active electronic components.

8. The optical linear phase demodulator/down converter in accordance with claim 1, further comprising a low pass filter configured to:

receive a signal from the optical amplitude modulator; and provide a low pass filtered optical signal.

9. The optical linear phase demodulator/down converter in accordance with claim 8, wherein:

the optical input signal comprises information within a microwave frequency range; and the low pass filtered optical signal comprises information within a base band frequency range.

10. The optical linear phase demodulator/down converter in accordance with claim 8, wherein:

the optical input signal comprises information within a microwave frequency range; and the low pass filtered optical signal comprises information within an intermediate frequency range.

11. A method for frequency down-conversion of an optical signal, the method comprising:

splitting an optical input signal into a first portion and a second portion;

modulating an amplitude of the second portion of the optical input signal in parallel with modulation of the first portion of the optical input signal;

receiving the modulated input signal from said optical amplitude modulator at a photo-detector;

receiving the modulated second portion of the optical input signal at a second photo-detector;

filtering, via a loop filter, a signal provided by the photo-detector;

filtering, via a second loop filter, an optical signal provided by the second photo-detector;

optically down converting a signal provided by the loop filter for generating a down converted optical signal;

providing the down converted optical signal to the photo-detector;

optically up converting a signal obtained from the second loop filter.

12. The method as claimed in claim 11, further comprising; low pass filtering a signal provided by the photo-detector for generating an output signal.

13. The method as claimed in claim 11, where said photo-detector comprises a balanced photo-detector.

14. The method in accordance with claim 11, wherein frequency down conversion is performed entirely in an optical domain.

15. The method in accordance with claim 11, wherein:

the optical input signal comprises information within a microwave frequency range; and the optical down converted signal comprises information within a base band frequency range.

* * * * *